United States Patent
Rund et al.

[19]

[11] Patent Number: 6,066,899
[45] Date of Patent: May 23, 2000

[54] RESETABLE BATTERY DRAIN LIMITATION CIRCUIT WITH COMPLEMENTARY DUAL VOLTAGE SETPOINTS

[75] Inventors: Larry D. Rund, Idyllwild; Richard P. Hewitt, Ramoland; Stuart O. Sigafoos, Perris, all of Calif.

[73] Assignee: Power Technics, Inc., Ramoland, Calif.

[21] Appl. No.: 08/902,930

[22] Filed: Jul. 30, 1997

Related U.S. Application Data

[60] Provisional application No. 60/022,910, Aug. 1, 1996.

[51] Int. Cl.[7] ...................................................... H02H 7/18
[52] U.S. Cl. ........................... 307/10.7; 361/92; 320/132; 340/636
[58] Field of Search .................................. 307/10.7, 10.6; 361/92; 340/636, 663; 320/132, 136

[56] References Cited

U.S. PATENT DOCUMENTS

| | | | |
|---|---|---|---|
| 4,493,001 | 1/1985 | Sheldrake | 307/10.7 |
| 5,089,762 | 2/1992 | Sloan | 307/10.7 |
| 5,200,877 | 4/1993 | Betton et al. | 361/92 |
| 5,327,068 | 7/1994 | Lendrum et al. | 320/136 |

*Primary Examiner*—Albert W. Paladini
*Attorney, Agent, or Firm*—Clyde R Christofferson

[57] ABSTRACT

A battery drain limitation circuit for use in engine powered vehicles and equipment which rely upon a battery to start the engine and also to operate accessories. When the engine is not running, the circuit disconnects the battery from all loads when battery charge, as measured by either one of two complementary means responsive to high and low drain rates, respectively, falls to a level below which the battery charge may not be sufficient to start the engine. High drain rates exaggerate battery voltage reduction below no load voltage levels, and are detected by a low cutoff voltage level after which the battery voltage recovers to reflect sufficient charge to start the engine. Battery dissipation from low drain rates is prevented by a long timing delay following detection of a high cutoff voltage level. The circuit is rendered inoperable if the engine is running, by means of a microphone which detects engine noise. The device is simple to install at the battery.

17 Claims, 8 Drawing Sheets

RESETABLE BATTERY DRAIN LIMITATION CIRCUIT WITH COMPLEMENTARY DUAL VOLTAGE SETPOINTS

This application claims benefit of Provisional Appl. No. 60/022,910 filed Aug. 1, 1996.

BACKGROUND OF THE INVENTION

1. Field of the Invention

The present invention generally relates to battery protection devices for use in engine powered vehicles and equipment which rely upon a battery to start the engine and, more particularly, to protective circuitry responsive to variation in the electrical characteristics of a battery due to different drain rates.

2. Description of the Prior Art

The battery used to start the engine in engine powered vehicles and equipment may be drained by the operation of associated electrical apparatus or by short circuits. The problem of preserving sufficient charge in the battery so that it is usable to start the engine has been variously resolved in the art. Conventional practice is to recharge the battery when the engine is running, so problem resolution focusses on drains which occur when the engine is not running. Common to such resolutions is the objective of detecting a battery discharge condition beyond which the battery may not be able to start the engine, and the objective of then interrupting further drain upon the battery, except when the engine is running.

U.S. Pat. No. 5,381,295 to the present applicants (Rund, et al.) discloses relevant prior art and those disclosures are incorporated herein by this reference.

It is common in the prior art to rely upon battery voltage to indicate the state of charge in the battery. In Rund et al., for example, there is described a cutoff voltage which, in relation to a reference voltage, indicates battery drain and triggers operation of the protective device, which then serves to disconnect the battery while there is still enough energy to start the vehicle engine. Similar use of a single low voltage point indicative of a battery drain condition is disclosed in a variety of other patents, including U.S. Pat. No. 4,493,001 to Sheldrake, U.S. Pat. No. 3,522,481 to Terzuc, U.S. Pat. No. 3,462,647 to Russell, U.S. Pat. No. 3,474,296 to Rickey, U.S. Pat. No. 3,623,131 to Russell, U.S. Pat. No. 3,646,354 to Von Brimer, U.S. Pat. No. 3,656,045 to Frezzolini et al., U.S. Pat. No. 3,648,145 to Meyer et al., U.S. Pat. No. 4,412,267 to Hansen, U.S. Pat. No. 4,137,557 to Ciarniello et al., U.S. Pat. No. 4,005,344 to Gaind et al., and U.S. Pat. No. 4,313,079 to Lee.

However, a cutoff voltage suitable for battery drain conditions of greatest concern—such as leaving the headlights on—will not be the same as a cutoff voltage suitable for lesser drain conditions, such as leaving the dome light on or leaving a vehicle parked for an extended period of time where there are electronic devices such as clocks or even the protective circuitry itself which are designed to draw a small amount of battery power continuously.

As is well known in the battery art, storage batteries operate by means of a chemical process, wherein electrons flow from the positive plate of each battery cell to the negative plate through an electrolyte. For example, in a lead-acid storage battery the positive plate is lead dioxide, the negative plate is lead and the electrolyte is sulfuric acid. The voltage across each cell is about 2.1 volts and is a function of the concentration of the electrolyte and the differences between the metals in the positive and negative plates. When the battery is connected to an external load, lead from lead dioxide in the positive plate combines with the sulfate radical in the sulfuric acid electrolyte to form lead sulfate, and oxygen from the lead dioxide combines with hydrogen from the sulfuric acid to form water. At the same time, a similar process converts lead in the positive plate to lead sulfate. As these processes continue, the positive and negative plates are both changing to lead sulfate, and therefore becoming more alike, and the water which is formed is diluting the sulfuric acid. These changes reduce the state of charge of the battery, and also reduce the voltage.

However, the rate at which electrons are absorbed at the negative plate is limited by the surface area of the plate. At high current drains electrons accumulate at the negative plate without being absorbed, thereby reducing battery voltage below a level which would accurately reflect the state of charge of the battery. When the high current drain stops (e.g. when the starter motor is shut off), the electrons which have not been absorbed will find their way back to the positive plate, thereby increasing battery voltage back to a level reflecting the state of charge of the battery.

By contrast, at low current drains the electrons flowing through the electrolyte will be absorbed at the negative plate and will not accumulate. Consequently, the voltage of the battery under a low current drain will slowly decrease, and will more accurately reflect the state of charge of the battery.

U.S. Pat. No. 4,493,001 to Sheldrake discloses a circuit and apparatus which is responsive to a prior art defect in voltage based battery protection devices, namely, the false detection of a battery discharge condition due to abrupt voltage drops incident to operator entry of the vehicle. Thus the disclosure in Sheldrake recognizes that low battery voltage by itself does not always indicate when there will not be enough power in the battery to start the vehicle. However, Sheldrake's approach is to compensate for a particular circumstance where the battery voltage is not a valid indicator, namely, when vehicle entry lights are turned on and a low voltage spike is produced. Sheldrake provides a three minute delay, which is enough time to start the engine after entry of the vehicle.

More recently, U.S. Pat. No. 4,902,956 to Sloan discloses means for measuring battery charge more accurately by detecting the battery discharge rate and using that discharge rate to variably set a threshold voltage level for triggering operation of the battery protection circuitry. This technique provides for disconnecting the battery at a lower voltage under heavy load conditions, but at a higher voltage when battery drain is due to parasitic loads over an extended period of time. Sloan recognizes that a voltage trigger suitable for heavy load conditions (such as leaving the headlights on) will not be suitable for light load conditions over a longer period (such as leaving glovebox light on). Sloan resolves this difficulty by detecting the drain rate of the battery. However, this solution adds to the complexity of the circuitry of the protection device, because of the need to detect and use the additional battery discharge rate information. In the preferred embodiment, Sloan provides for a microprocessor implementation.

A more recent Sloan patent, U.S. Pat. No. 5,089,762, further adds to detection circuit complexity by adding temperature as a factor affecting the appropriate voltage for triggering operation of the battery protection circuitry. Again, a microprocessor is used to set the appropriate triggering voltage. A further Sloan patent, U.S. Pat. No. 5,332,958, provides for a microprocessor controlled upward adjustment of the battery cutoff voltage over time so that the battery will be disconnected after vehicle storage or during other long periods of disuse.

What is needed is a simpler approach which relies upon measurements of battery voltage, yet is able to protect the battery under a variety of drain conditions.

SUMMARY OF THE INVENTION

It is therefore an object of the present invention to protect against a wide range of high and low battery drain conditions by measuring voltage and without measuring drain rate.

It is another object of the present invention to provide a battery protection device operable under both high and low drain conditions using simple and easy to manufacture circuitry.

It is a further object of the invention to provide battery protection which is effective for a reasonable range of battery sizes, types, and states of charge, including, for example, automobile batteries which must support very high drain rates to operate a starter motor as well as rugged deep discharge batteries.

It is also an object of the invention to protect the battery from premature discharge under a variety of common usage patterns to which batteries are subjected by vehicle owners, including a succession of battery drains without adequate intervening recharging cycles.

The device according to the invention provides for detection of two cutoff voltages. When battery voltage drops below each of these cutoff points, a different sequence of events is initiated. In combination, these differing event sequences enable the invention to disconnect the battery appropriately under a wide range of high drain and low drain conditions, without having to detect the rate of discharge of the battery.

In accordance with the present invention, a high cutoff voltage and a low cutoff voltage are set relative to a constant reference voltage for the battery. When the engine is not running and the battery is discharging, a long timer is started when the voltage drops below the high cutoff voltage. If the long timer runs out before the engine is started a disconnection sequence will be triggered. If the voltage drops below the low cutoff voltage, the same disconnection sequence will be triggered. The disconnection sequence provides a short delay before disconnecting the battery.

The low cutoff voltage is set so that under moderate drain conditions (e.g. 7 to 10 amps in a normal vehicle battery) the low cutoff voltage (e.g. 11.7 volts) indicates that the battery retains about half its charge, which is sufficient to start the engine under most circumstances. Upon disconnection the battery voltage will then recover to a level (e.g. 12.2 or 12.3 volts) indicative of about half charge under no load conditions.

Setting the low cutoff voltage in this fashion will provide protection against moderate drain conditions. It will also protect against higher drain rates (e.g. greater than 7 to 10 amps in a normal vehicle battery) but not necessarily against lower drain rates (e.g. less than 7 to 10 amps). For example, under low drain conditions, by the time the low cutoff voltage is reached the battery may be nearly dead and there will be very little recovery in the voltage level after the drain is disconnected. By contrast, under very high drain conditions the battery voltage will more quickly drop but will then recover to a higher voltage level after the drain is disconnected. These differences are explained by the tendency to accumulate unabsorbed electrons at the negative plates of the storage battery during high drain rates, as described above. The character of the low cutoff voltage is shown by the "Low Set Point" line 410 of FIG. 4. For the reasons stated in the foregoing description, lower drain rates will leave the battery with less charge by the time the low voltage set point is reached and the drain is disconnected. By contrast, higher drain rates will reach the low voltage set point more quickly and after disconnection there will be greater recovery of voltage. The rising slope of line 410 reflects these observations.

The high cutoff voltage coupled with the long timer provides a complementary strategy. In order to leave enough charge in the battery to start the engine, a higher cutoff voltage could be coupled with a longer delay or a reduced cutoff voltage could be coupled with a shorter delay. However, it is desirable to set the high cutoff voltage low enough to avoid unnecessary disconnections. For example, too high a high cutoff voltage could trigger disconnection of the battery while the vehicle sits idle in an airport parking lot for a week or two, or in the middle of a tailgate party while there is ample charge in the battery to operate the radio. In the preferred embodiment, the high cutoff voltage is set to a level which, under no load conditions, would indicate that the battery is about half charged. The long timer is set so that if there is a low to moderate drain during the period of the long timer, there will still be about a half charge left in the battery after the timer runs out.

This strategy provides battery protection which is effective for low to moderate drain rates. This strategy, which has a long delay which is fixed, will leave the battery with greater charge upon disconnection the lower the drain rate, since at lower drain rates there will be less cumulative discharge during the same long delay period. Thus the strategy is even more effective at drain rates lower than the low to moderate drain rate at which the device has been designed and tested. For example, a one ampere drain can continue for a number of hours without significantly depleting the charge on a typical vehicle battery. After experimentation, it was determined that a long timer of about two hours duration and a high cutoff voltage of about 12.3 volts provides good protection for a low drain rate (e.g. one ampere), where there is little voltage recovery after disconnection. Even better protection (in the sense that there will be even more charge left in the battery after disconnection) will be provided for even lower drain rates, because less charge will be dissipated during the fixed period of the long timer.

Furthermore, there is ample margin, in the target objective of having about a half charge left in the battery after disconnection, to provide adequate battery protection under most circumstances for drain rates in the low to moderate range. While more charge is dissipated for moderate drain rates, the long timer will be tripped sooner and there will be greater voltage recovery after disconnection, because of the tendency for higher drain rates to accumulate electrons at the negative battery plates and thereby exaggerate the lowered voltage reading in relation to actual battery charge, that is, battery charge as would be measured by specific gravity of the electrolyte.

The character of the complementary high cutoff voltage strategy is shown by line 420 in FIG. 4. At lower drain rates, the fixed long delay after the high voltage setpoint is reached will not allow as large a reduction of the charge on the battery as would be allowed for a higher drain rate. This effect is muted somewhat for higher drain rates and fully charged batteries because the exaggeration of voltage drop, due to the above described tendency to accumulate unabsorbed electrons at the negative plates of the battery, will mean that higher drain rates will trigger the high cutoff voltage at an earlier point in battery discharge because the high cutoff voltage reflects less than a full battery charge. The declining slope of line 420 in FIG. 4 reflects these observations.

A further aspect of the invention is to be found in the relationship between the recharging cycle and the resetting of the long timer after successive discharge events. The long timer permits the battery to be drained for a period of time (e.g. two hours) after the voltage falls below the high cutoff level. In the best of circumstances the engine is engaged and the battery is recharged after such a drain. However, vehicle usage patterns may not provide the optimal intervening recharge. In that situation, after another discharge event (e.g. leaving the door ajar and the dome lights on) the battery voltage may not recover after disconnection to a high enough level (i.e. above the high cutoff voltage) to reset the long timer. Consequently, when the battery protection device is reset there will not be another long delay before the battery is again disconnected, since the long timer has not been reset. Instead, there will be allowed only a short delay, long enough to start the engine.

In combination, these two battery protection strategies—one having a low cutoff voltage to handle high drains and the other having a high cutoff voltage coupled with a long delay to handle low drains—as implemented by the present invention serve to protect the battery from a wide range of both slow and fast drains, under common battery usage patterns.

DETAILED DESCRIPTION OF PREFERRED EMBODIMENTS OF THE INVENTION

Figures 1, 1A:
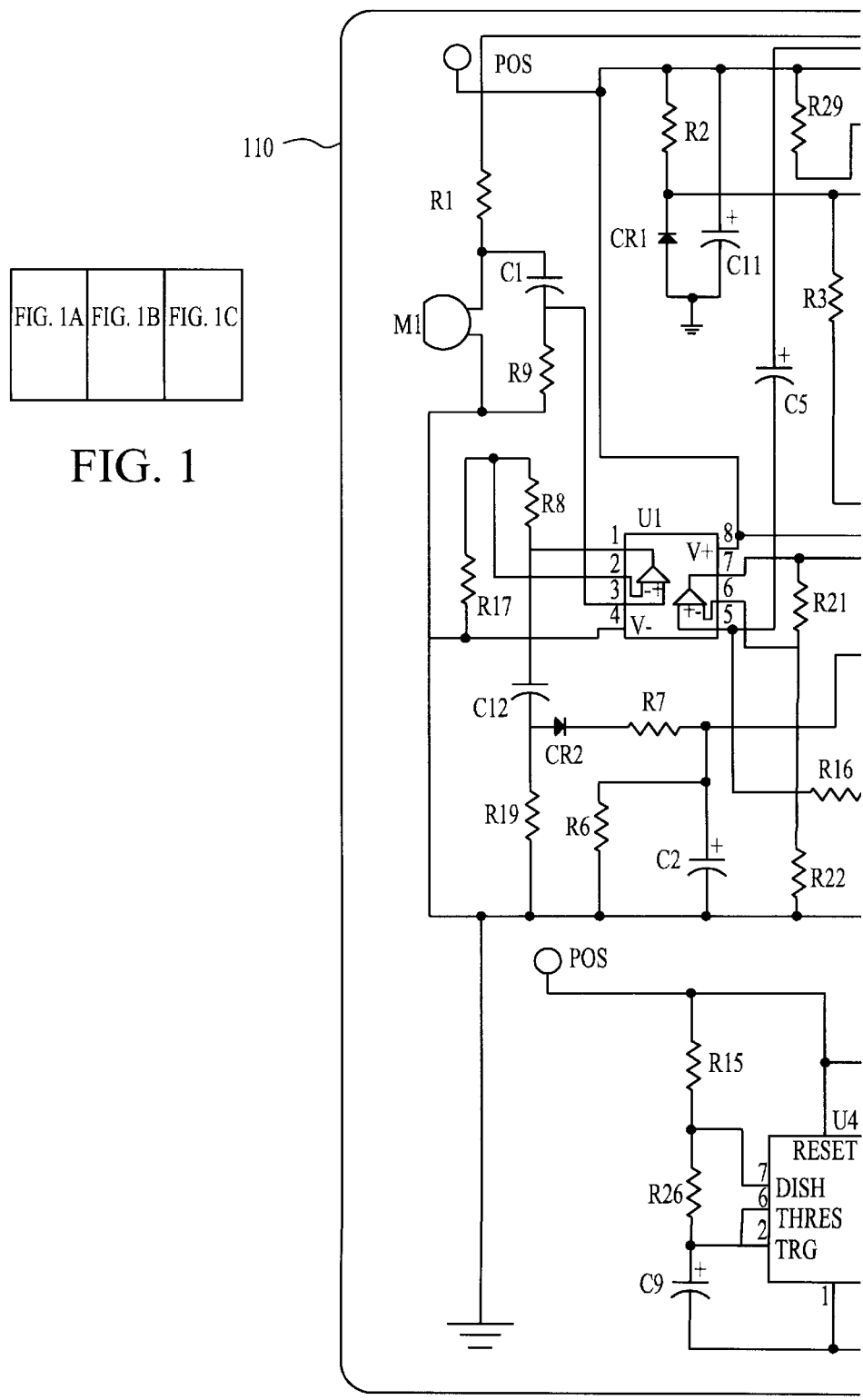
FIG. 1 is a circuit diagram of the battery limitation device containing the present invention.
Figure 1B:
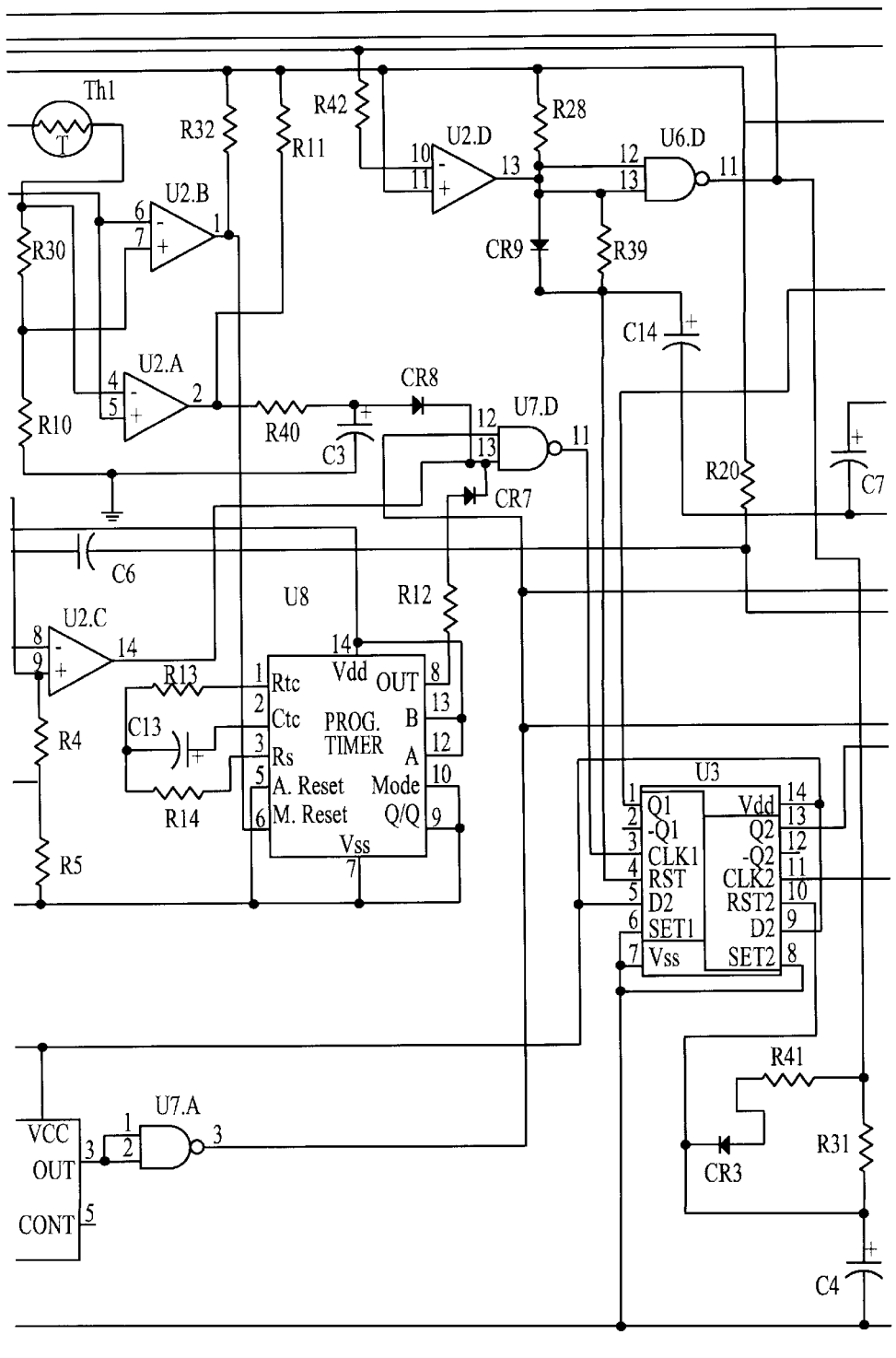
Figure 1C:
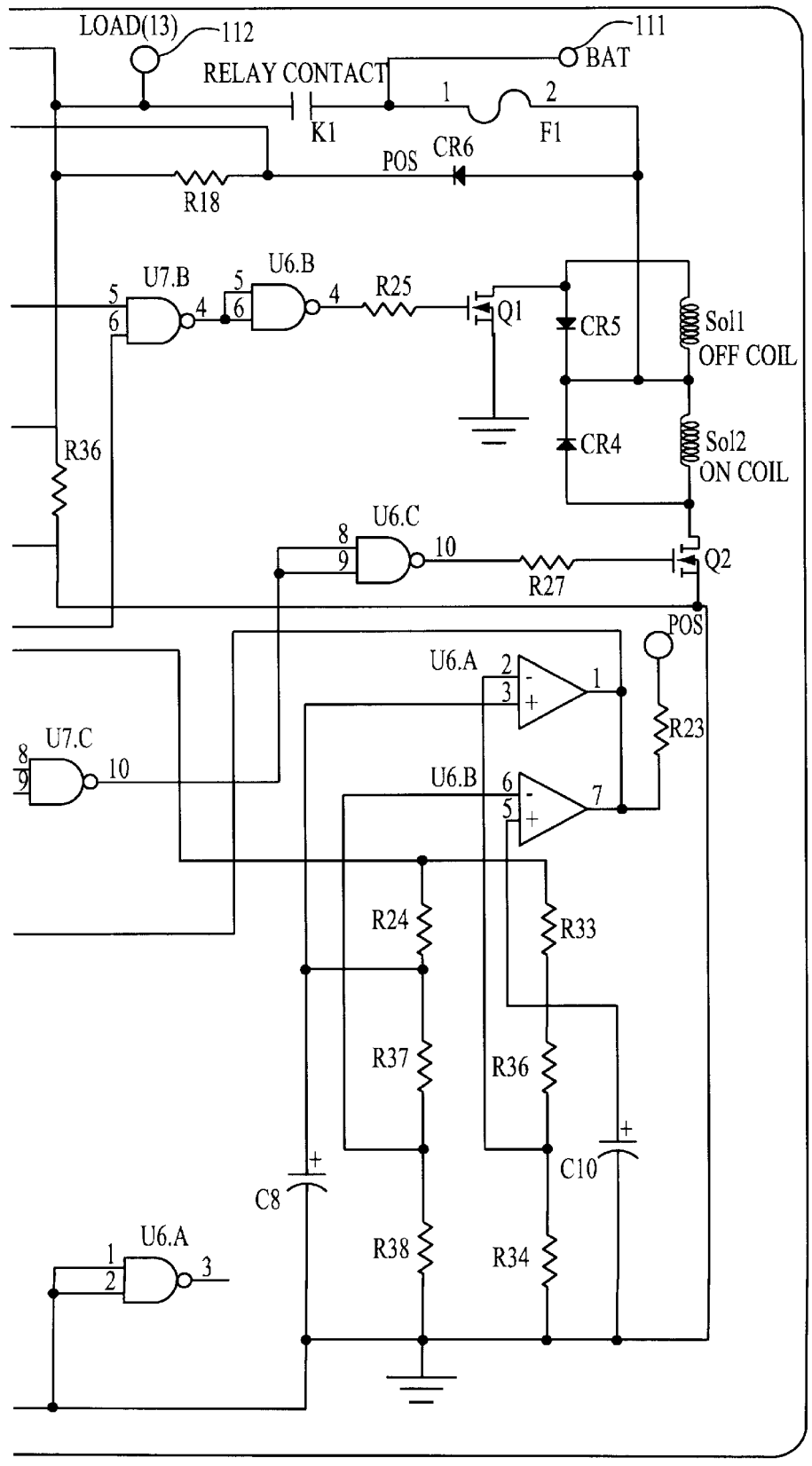

Referring now to the schematic diagrams, and more particularly to FIG. 1, there is shown a battery drain limitation device 110 attached between, for example, an automobile battery 111 and a vehicle load 112. The load 112, while shown as a single resistive load in FIG. 1, is in fact composed of a plurality of loads as further shown in FIG. 2 including, for example, clocks, radio memory and other small loads which normally are connected even when the vehicle is not in operation (Load 1 in FIG. 2), head lights and stop lights (Load 2 in FIG. 2), radio and dome or running lights (Load 3 in FIG. 2), and the starter motor (Load 4 in FIG. 2).

For any particular vehicle or equipment having a battery operated starter motor and an engine, when the electrical characteristics of the battery are considered in light of the power required by the starter motor to start the engine under anticipated operating conditions, there will be a threshold no load battery voltage at which the battery charge is sufficient to start the engine and below which the battery charge may not be sufficient to start the engine. By way of example only, and not as a limitation, this threshold voltage (hereinafter "threshold no load voltage level") will be taken to be 12.2 volts at no load for a standard 12 volt battery in a typical automobile.

Figure 2:
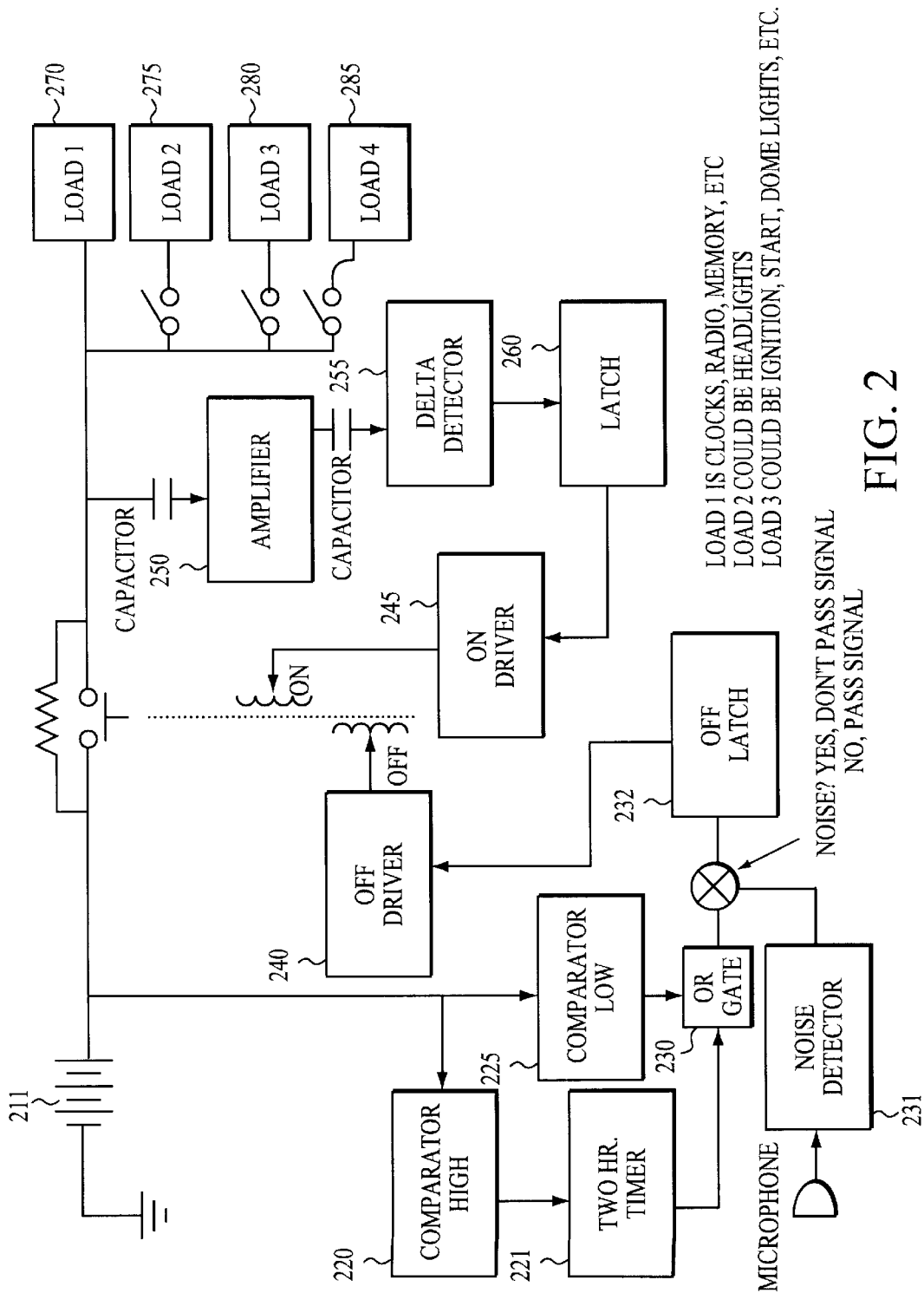
FIG. 2 is a block diagram showing the dual setpoint device which implements the present invention.
Figure 3A:
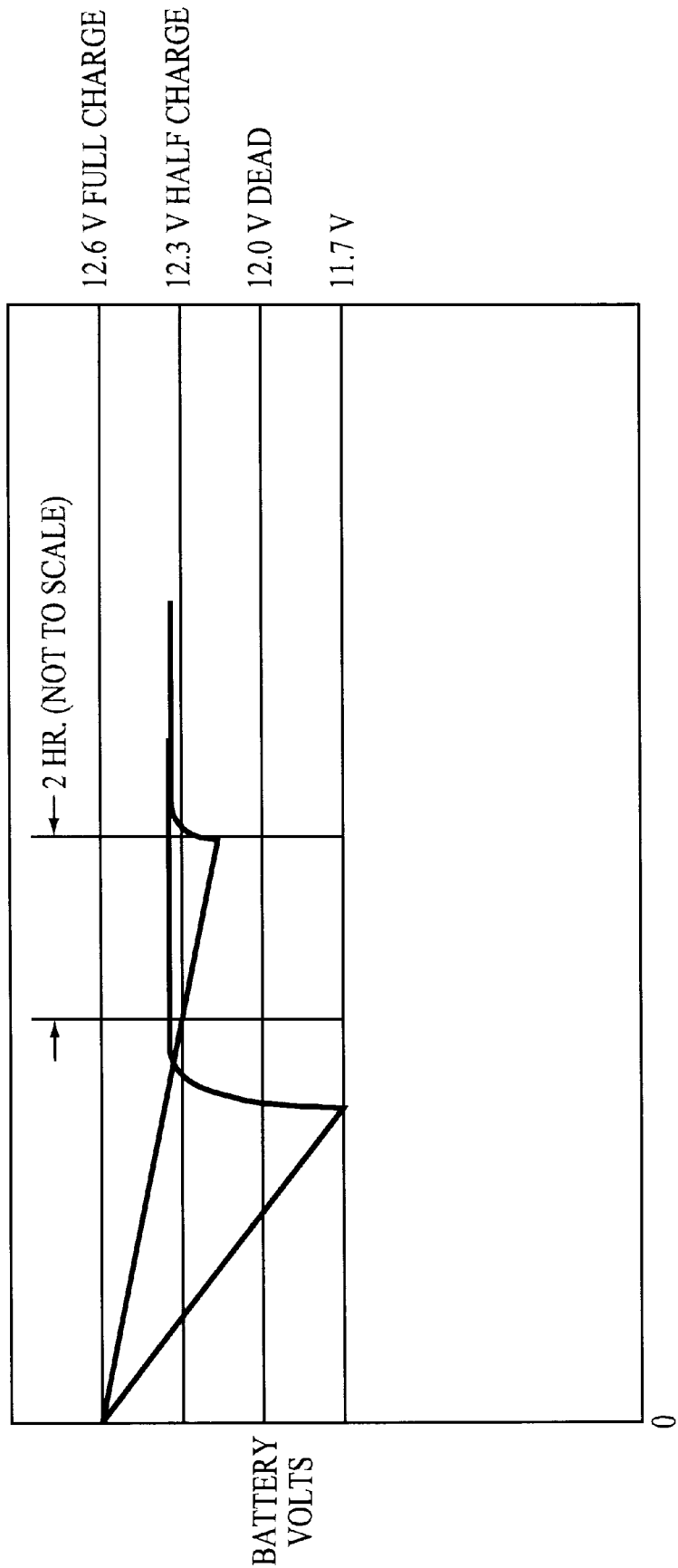
FIGS. 3A and 3B are timing diagrams showing operation of the invention with a fully charged and a partially charged battery, respectively.
Figure 3B:
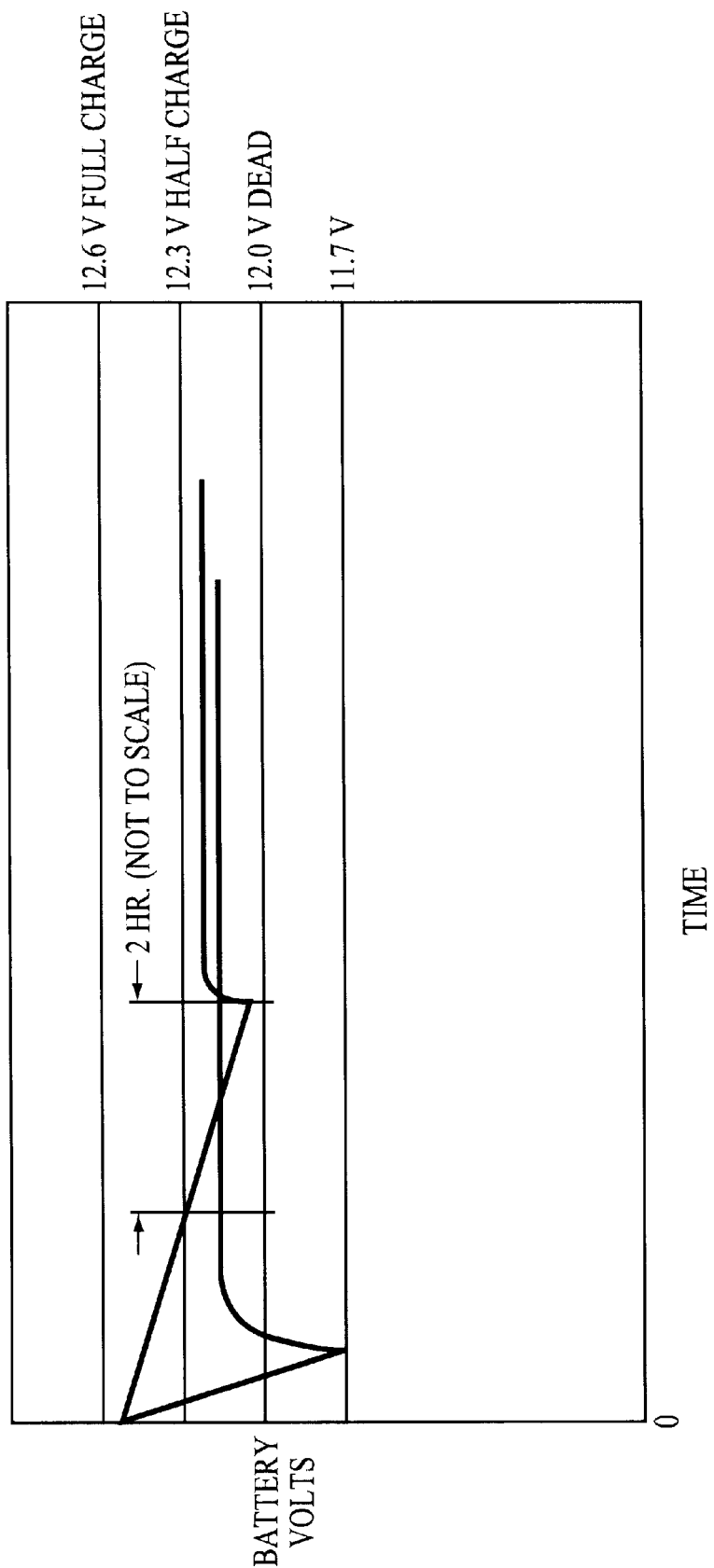
Figure 4:
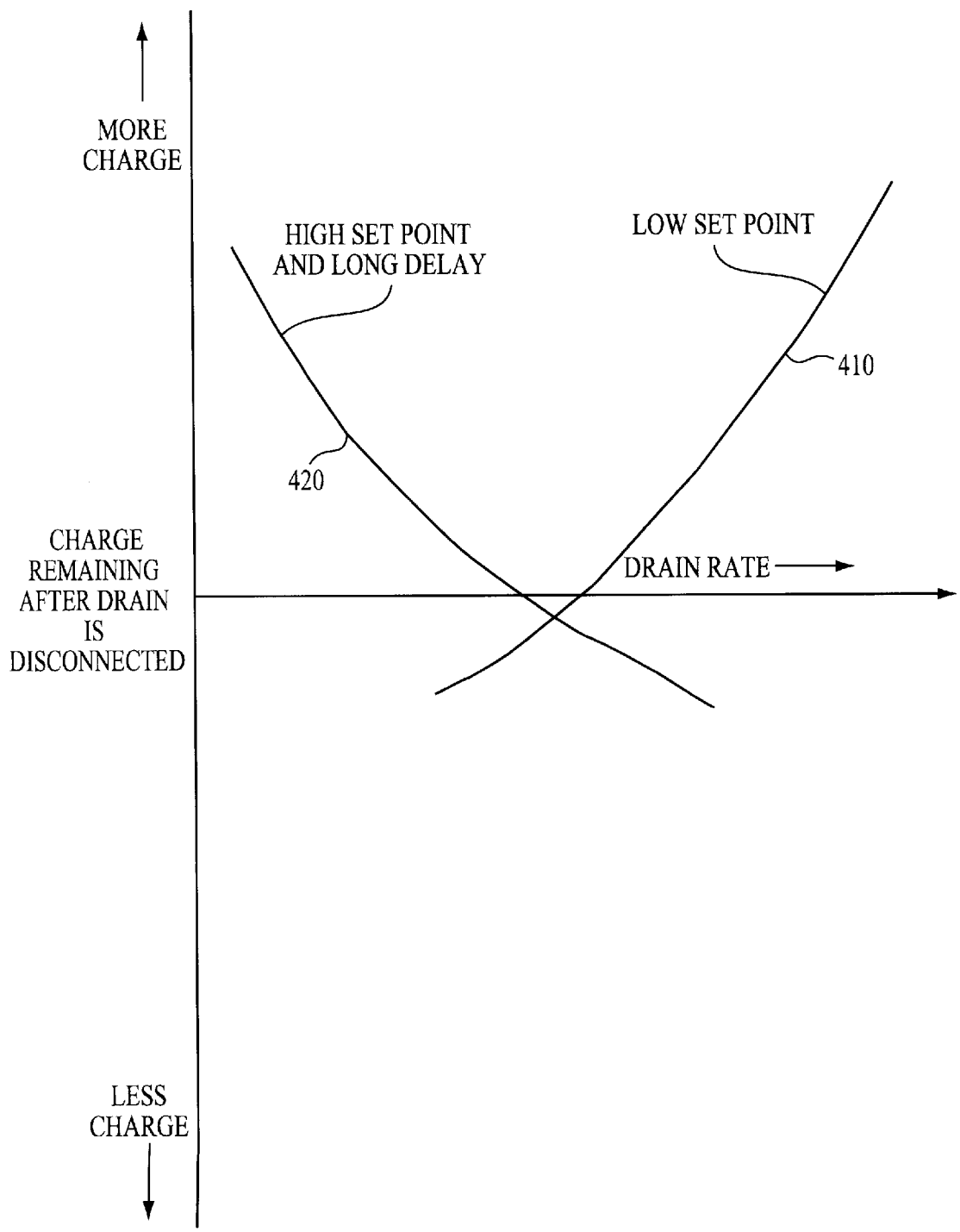
FIG. 4 is a diagram showing the complementary operation of the dual setpoint strategies for protecting a battery with the present invention.

FIG. 2 shows a block diagram of the components of the battery limitation device of the present invention. A high comparator 220 is set to detect an upper cutoff voltage, which is above the threshold no load voltage level. When the battery voltage under load conditions falls below this upper cutoff voltage level, a long timer 221 (for example, two hours) will be set in motion. If the long timer 221 runs out, without being reset by high battery voltage from operation of the recharging system or recovery after removal of the load, then a signal will be sent to a gate 230.

A low comparator 225 is set to detect a lower cutoff voltage. When the battery voltage under load conditions falls below this lower cutoff voltage level, a signal will be sent to gate 230. Thus, there will be a signal at the output of gate 230 in either of two circumstances: when battery voltage falls below the lower voltage cutoff level, or a long timer delay period after the battery voltage falls below the upper voltage cutoff level. If the engine is not operating, as determined by noise detector 231, the output signal from gate 230 will be passed to off latch 232 which will then trigger off driver 240 which will then disconnect the battery from all loads 270, 275, 280 and 285.

Long timer 221 is set so that battery drain during the long timer period (e.g. two hours) from moderate loads (e.g. dome lights at load 280) will still leave the battery with enough charge (e.g. about half of a full charge) to enable the vehicle ignition system and starter motor to start the engine. This will also, of course, protect the battery against drain from lesser loads (e.g. the radio at load 280) which during the same long timer period will drain even less of the battery's charge.

The upper cutoff voltage is preferably chosen at a low enough level that the battery disconnect circuitry responsive to long timer 221 will seldom be triggered under normal conditions when the vehicle is not in operation and yet the battery is being drained by those loads 270 which remain connected under such conditions. For example, the vehicle may be parked for several weeks at an airport while the owner takes a trip, during which time the vehicle clock and radio memory will of course be draining the battery. Or the vehicle owner may wish to operate the radio or other small drains for recreational purposes while the engine is off. On the other hand the upper cutoff voltage should be chosen at a high enough level to allow a reasonable margin for starting the engine after inadvertently leaving low drains on after the engine has been shut down.

Turning back to FIG. 1 and the specific circuitry of the battery drain limitation device 110, resistor R2 and Zener diode CR1 provide a stable reference voltage which is fed to comparators U2A and U2B. Voltage divider network R29, R30 and R10 provide triggering for comparators U2B and U2A when the voltage at battery 111 reaches high (e.g. 12.3 volts) and low (e.g. 11.7 volts) voltage cutoff levels, respectively.

When battery voltage drops below the high cutoff level, the output of U2B goes low and starts long timer U8. When the timer runs out, the output of U8 (pin 8) goes high. This high voltage cutoff trip signal output is coupled to AND gate U7D (pin 13) through isolation network R12 and diode CR7. The output of comparator U2A goes high when the battery voltage drops below the lower cutoff level. This low voltage cutoff trip signal output is coupled to AND gate U7D (pin 13) through isolation diode CR8. Capacitor C3 provides a small time delay of approximately five seconds. In the event that the low cutoff voltage is reached because of high drain from the starter motor, this delay will allow the noise detection circuitry (microphone M1, amplifier U1 and comparator U2C) to generate a signal and avoid inappropriate disconnection of the battery. Note that the noise detection circuitry is operable only when the contacts of relay K1 are closed. This logic is more clearly shown in FIG. 5, where a signal indicating that the engine is running is output to a gate 540, and where this signal will not be effective in triggering the output of gate 540, unless the status of the contacts, which is stored at logic block 530, indicates that the contacts are closed and a "connected" signal is output to gate 540.

AND gate U7D will not trigger if pin 13 is held low by engine noise. Microphone M1 is coupled to amplifier U1A, whose output is rectified and filtered by diode CR2, resistors R7 and R8, and capacitor C2. This voltage is compared to a reference voltage by comparator U2C, whose output is low if there is engine noise. In that situation low output from comparator U2C will hold pin 13 of gate U7D low, and neither of the voltage cutoff signal circuits will operate. However, if there is no engine noise the output of comparator U2C will be high, allowing the trip signals from either the high voltage cutoff or low voltage cutoff circuits to pull pin 13 of gate U7D high. This will allow the clock pulse on pin 12 of U7D to be output on pin 11 of U7D and be applied to the clock input (pin 3) of D type flip-flop U3. Then output (pin 1) of flip-flop U3 will go high, allowing the clock pulse to pass to the gate of field effect transistor Q1, via gates U7B and U6B and resistor R25. In turn, this allows current to pass through latching OFF coil K1A and disconnect the battery from the load 112.

The clock pulse is generated by clock U4 and has a length of about 40 milliseconds and a period of about 1.5 seconds. The clock is applied not only to gate U7D but also to gate U7B. This has the effect of pulsing the latching coil K1A if for some reason it did not latch the first time, to make sure it does latch. Comparator U2D detects if the relay contacts K1 have been opened or closed, and the output of U2D is also inverted by gate U6D. These outputs are coupled to time constant filters which provide a delay of approximately 10 seconds for the circuit to stabilize after either disconnecting or connecting the battery. R39, C14, and CR9 filter the output of U2D and keep the OFF flip-flop U3A from working when the relay contacts K1 are open; R31, C4 and CR3 filter the inverted output of U6D and keep the ON flip-flop U3B from working when the contacts are closed.

When the contacts are open, R18 lets a small current pass to the vehicle (approximately 10 mA when the headlights are left on, less if a cellular phone is left on). R36 and C7 form a voltage divider that lets U2D detect if the contacts are open or closed. Whatever the voltage is at the junction of R18 and R36, it will remain at that voltage until something in the vehicle changes, e.g. a door opening, starter solenoid engaged, headlights cycled, etc. This voltage change is coupled by C5 to amplifier U1B. R16 isolates the voltage divider R4 and R5 from the amplifier; R21 and R22 set the gain of the amplifier (e.g. to approximately 1000: 6 mV at R4 and R5 give 6 V at pin 7 of amplifier U1B). When there is a change in the vehicle, a large voltage swing is seen at the output (pin 7) of U1B. This change is coupled by C6 to the dual time constant divider R24 and R33 (same values), R37 and R35 (same values), R38 and R34 (same values), and C8 and C10 (different values). The two comparators U5A and U5B measure the voltages across the divider. Since each leg of the divider has a different time constant, a change in the applied voltage can be detected. If the voltage increases, the output of U5A will go low. If the voltage decreases, the output of U5B will go low. When either output goes low, it will return to a high. This rising edge will trigger U3B (pin 11), causing the Q output to go high (pin 13), allowing the clock pulse to pass through U7C and U6C, turning on field effect transistor Q2, allowing current to flow through the ON coil K1B, closing relay contacts K1 and resetting the device. After a 10 second delay (produced by time constant filter R31, C4 and CR3), the process can start over again.

Figure 5:
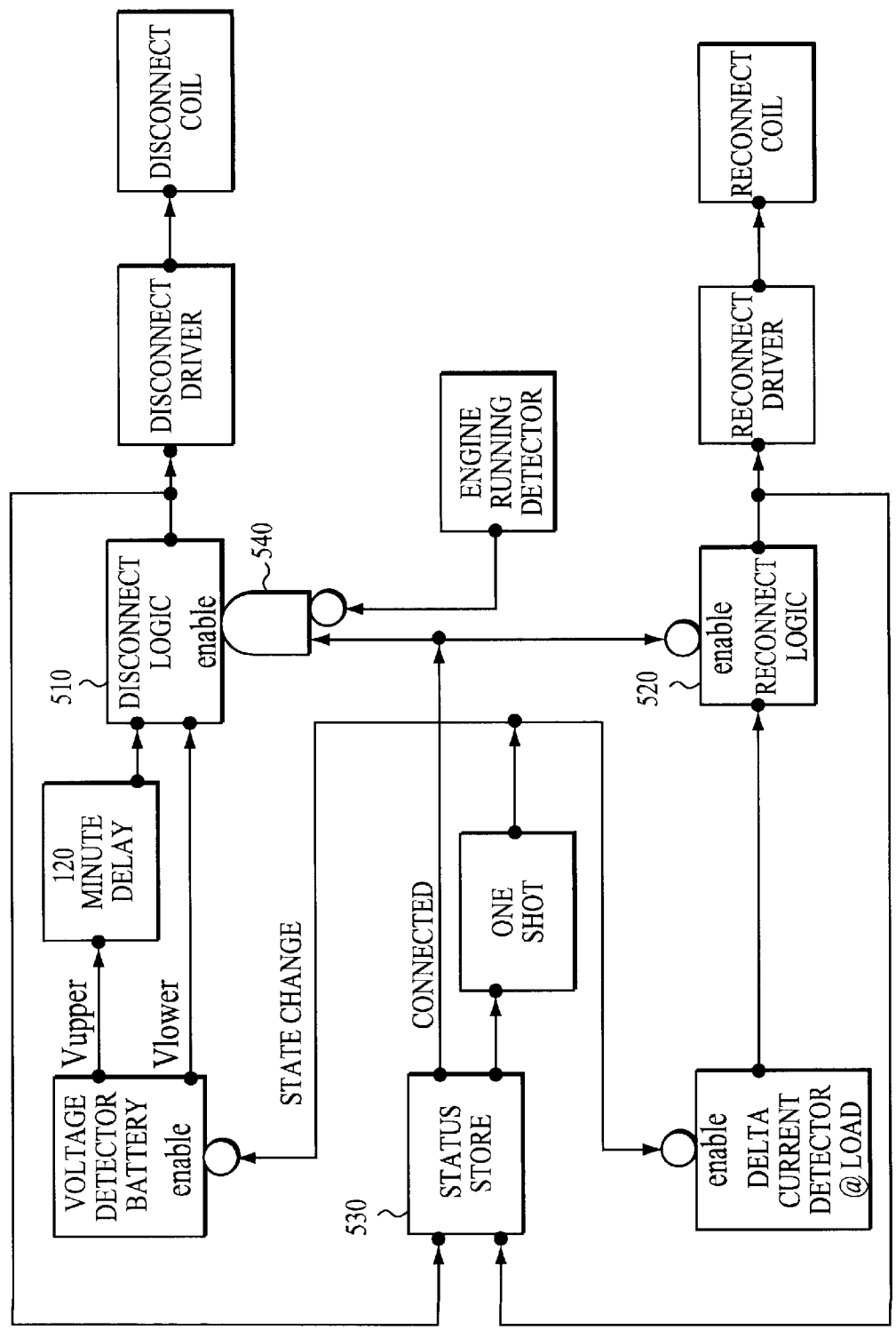
FIG. 5 is a diagram showing the logic of the present invention for implementation using microprocessor circuitry.

The implementation of the invention shown in FIG. 1 relies upon discrete circuit components. However, the logic of the invention can also be implemented with microprocessor circuitry. FIG. 5 shows the invention in a block diagram form suitable for implementation of logic elements using microprocessor circuitry rather than discrete components.

While the invention has been described in terms of one preferred embodiment, those skilled in the art will recognize that the invention can be practiced with modifications that are within the spirit and scope of the invention as defined in the claims that follow.

Having thus described our invention, what we claim as new and desire to secure by Letters Patent is as follows:

1. In an engine powered vehicle or equipment having a battery operated electric starter motor and other electrical accessories, said battery having a threshold no load voltage level below which there may not be enough energy in said battery to operate said electric starter motor to start said engine, a battery drain limitation device, comprising:

a complementary dual voltage detection means for determining a low charge condition on said battery, said low charge condition being equivalent to a no load battery voltage at or below said threshold voltage level;

a second detection means for determining whether said engine is running;

interrupting means, responsive to said complementary dual voltage detection means and said second detection means, for disconnecting the flow of current from said battery when said low charge condition is detected and when said engine is not running, and reset means for reconnecting the flow of current from said battery to said starter motor and said accessories.

2. The device of claim 1, wherein said complementary dual voltage detection means comprises a high drain detection means and a low drain detection means, said high drain detection means being operable to detect moderate to high drains and said low drain detection means being operable to detect low to moderate drains.

3. The device of claim 2, wherein said complementary dual voltage detection means includes means for setting a stable reference voltage.

4. The device of claim 3, wherein said high drain detection means comprises means for detecting a low voltage cutoff level and said low drain detection means comprises means for detecting a high voltage cutoff level and long timer means for delaying response of said interrupting means to said low drain detection means.

5. The device of claim 4, wherein said accessories include accessories normally operable when said engine is off, and wherein said high voltage cutoff level is set low enough so that under normal operating conditions of said vehicle or equipment said normally operable accessories will not cause said low drain detection means to be operable.

6. The device of claim 4, wherein said low voltage cutoff level is set so that if said battery reaches said low voltage cutoff level in response to discharge by a moderate to high drain source, there remains in said battery sufficient charge to operate said electric starter motor to start said engine, and wherein said high voltage cutoff level and said long delay timer are set so that if said battery reaches said high voltage cutoff level in response to discharge by a low to moderate drain source, when said long delay timer runs out there remains sufficient charge in said battery to operate said electric starter motor to start said engine.

7. The device of claim 6, wherein said long delay timer is reset when said battery is recharged above said high cutoff voltage level.

8. The device of claim 7, wherein said interrupting means includes short delay means for delaying battery disconnection long enough to start said engine.

9. The device of claim 8, wherein said high voltage cutoff level is set at a level which, under no load conditions, would indicate said battery retains about half its charge.

10. The device of claim 7, wherein said low voltage level detection means comprises first means for measuring the voltage of said battery relative to said low voltage cutoff level, said first measuring means having a first output voltage, said first output voltage being equal to said stable reference voltage when said battery voltage falls to said low cutoff voltage, and low voltage comparing means for determining when said first output voltage is equal to said stable reference voltage.

11. The device of claim 10, wherein said high voltage level detection means comprises second means for measuring the voltage of said battery relative to said high voltage cutoff level, said second measuring means having a second output voltage, said second output voltage being equal to said stable reference voltage when said battery voltage falls to said high cutoff voltage, and high voltage comparing means for determining when said second output voltage is equal to said stable reference voltage.

12. The device of claim 11, wherein said second detection means comprises sound-responsive means for detecting noise produced by operation of said engine or operation of said starter motor, wherein responsiveness of said interrupting means to said high drain detection means is delayed by said short delay means long enough to allow operation of said starter motor to be detected by said sound-responsive means.

13. A battery drain limitation device, comprising:
a complementary dual voltage setpoint detection circuit for determining a low charge condition on said battery; and
an interruption circuit, responsive to said complementary dual voltage setpoint detection circuit, for disconnecting the flow of current from said battery when said low charge condition is detected.

14. The device of claim 13, further comprising a reset circuit for reconnecting the flow of current from said battery.

15. The device of claim 13, wherein said complementary dual voltage setpoint detection circuit is comprised of a high drain detection circuit and a low drain detection circuit.

16. The device of claim 15, wherein said high drain detection circuit is operable when said battery voltage falls below a low cutoff voltage, said low cutoff voltage being chosen so that under moderate to high drain conditions said battery retains about half its charge.

17. The device of claim 16, wherein said low drain detection circuit is operable a set time period after said battery voltage falls below a high cutoff voltage, said high cutoff voltage and said set time period being chosen so that under low to moderate drain conditions said battery retains about half its charge.

* * * * *